(12) United States Patent
Chaulk et al.

(10) Patent No.: US 9,904,724 B1
(45) Date of Patent: Feb. 27, 2018

(54) METHOD AND APPARATUS FOR MESSAGE BASED SECURITY AUDIT LOGGING

(71) Applicant: EMC Corporation, Hopkinton, MA (US)

(72) Inventors: Christopher A. Chaulk, Franklin, MA (US); Afzal Rahman Jan, Bangalore (IN); Prabhakaran Rathinagiri, Bangalore (IN); Nimai Sood, Bangalore (IN); Sameer S. Chauhan, Sydney (AU)

(73) Assignee: EMC Corporation, Hopkinton, MA (US)

( * ) Notice: Subject to any disclaimer, the term of this patent is extended or adjusted under 35 U.S.C. 154(b) by 216 days.

(21) Appl. No.: 14/041,281

(22) Filed: Sep. 30, 2013

(51) Int. Cl.
*G06F 17/30* (2006.01)

(52) U.S. Cl.
CPC .............................. *G06F 17/30598* (2013.01)

(58) Field of Classification Search
None
See application file for complete search history.

(56) References Cited

U.S. PATENT DOCUMENTS

| 6,085,191 A * | 7/2000 | Fisher et al. ................... 707/737 |
| 7,908,160 B2 * | 3/2011 | Bhargava ...................... 705/7.41 |
| 2003/0167352 A1 * | 9/2003 | Hoshiai et al. ............... 709/318 |
| 2006/0080120 A1 * | 4/2006 | Tcherevik ............... G06F 9/542 |
| | | 719/318 |
| 2010/0185693 A1 * | 7/2010 | Murty et al. .................. 707/803 |
| 2012/0036397 A1 * | 2/2012 | Balani ................... G06F 11/079 |
| | | 714/38.11 |
| 2014/0025700 A1 * | 1/2014 | Schoning ...................... 707/760 |

* cited by examiner

*Primary Examiner* — Khanh B Pham
(74) *Attorney, Agent, or Firm* — Ryan, Mason & Lewis, LLP (57) ABSTRACT

Example embodiments of the present invention provide a method, an apparatus, and a computer program product for message based security audit logging. The method includes receiving an event notification related to an event in a storage resource management service, processing the event notification according to a messaging fabric and an ontology model, and, according to the processed event notification, persisting an audit log entry corresponding to the event.

21 Claims, 11 Drawing Sheets

METHOD AND APPARATUS FOR MESSAGE BASED SECURITY AUDIT LOGGING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to audit logging.

BACKGROUND

An audit trail (or audit log) is a security-relevant chronological record, set of records, or destination and source of records that provide documentary evidence of the sequence of activities that have affected at any time a specific operation, procedure, or event. Audit records typically result from activities such as financial transactions, scientific research and health care data transactions, or communications by individual people, systems, accounts, or other entities.

SUMMARY

Example embodiments of the present invention provide a method, an apparatus, and a computer program product for message based security audit logging. The method includes receiving an event notification related to an event in a storage resource management service, processing the event notification according to a messaging fabric and an ontology model, and, according to the processed event notification, persisting an audit log entry corresponding to the event.

BRIEF DESCRIPTION OF THE DRAWINGS

The above and further advantages of the present invention may be better under stood by referring to the following description taken into conjunction with the accompanying drawings in which.

DETAILED DESCRIPTION

Audit logging is an important security feature for products in the market to record changes made in creation, configurations, modification, and deletion of, for example, resources. Formerly, the approach to audit any security operation could use a logging-based implementation or file- or database-based persistence mechanism. However, such traditional methods have numerous disadvantages. For example, (1) the functional components are tightly coupled with the audit logging system/component and (2) the functional components may require a special care to audit (e.g., they may explicitly call the audit logging API). Further, (3) in a service based architecture, each service may require a dependency on the audit logging system which is adding class objects loaded in the memory of the heap (i.e., if two virtual machines want to audit log, they have to have the audit logging dependency in their service thereby consuming excess system memory by requiring a duplicate heap for the audit component) and (4) file-based audit logging is not extendable when a new audit parameter is introduced and existing audit logging mechanisms do not scale when new parameters or services are added. Additionally, (5) enabling a new service to audit at runtime is not possible. Moreover, (6) in the case of a file-based audit mechanism, IO operations are more CPU intensive. Finally, (7) reliability on audit data is dependent on whether the service or component is running (i.e., in the case that the audit service or any other component involved is down, the generated audit message will be ignored which is a serious security violation).

A message based, ontology driven, data persistence design according to example embodiments of the present invention can simplify and decouple the audit logging functionality and overcome these and other disadvantages. For example, according to example embodiments of the present invention, (1) functional and audit components may be decoupled, thereby requiring no dependency of the audit service and (2) the topic has to be added in the audit model store only one time. Further, (3) there is no dependency with other components and, therefore, it is not loaded in the memory of the heap in whichever service is audit logging. Importantly, (4) example embodiments of the present invention can scale any number of parameters and (5) add new services to the audit system at runtime (e.g., by adding the topic in the audit model store and notifying the audit system that new topic is added). Moreover, (6) any kind of in memory store can be used since data format may be in key value fashion. Finally, (7) the messaging subsystem is reliable such that it can hold the message in case the audit service is down (i.e., it will dispatch the message once the audit service is back up and any generated audit data will not be lost even when the audit service is down).

Accordingly, example embodiments of the present invention introduce ontology modeling of audit messages and embed with the functional messages. When functional event (or message) is published based on some user action into the message framework (or cloud), it is audit logged automatically by the audit service listeners.

Figure 1:
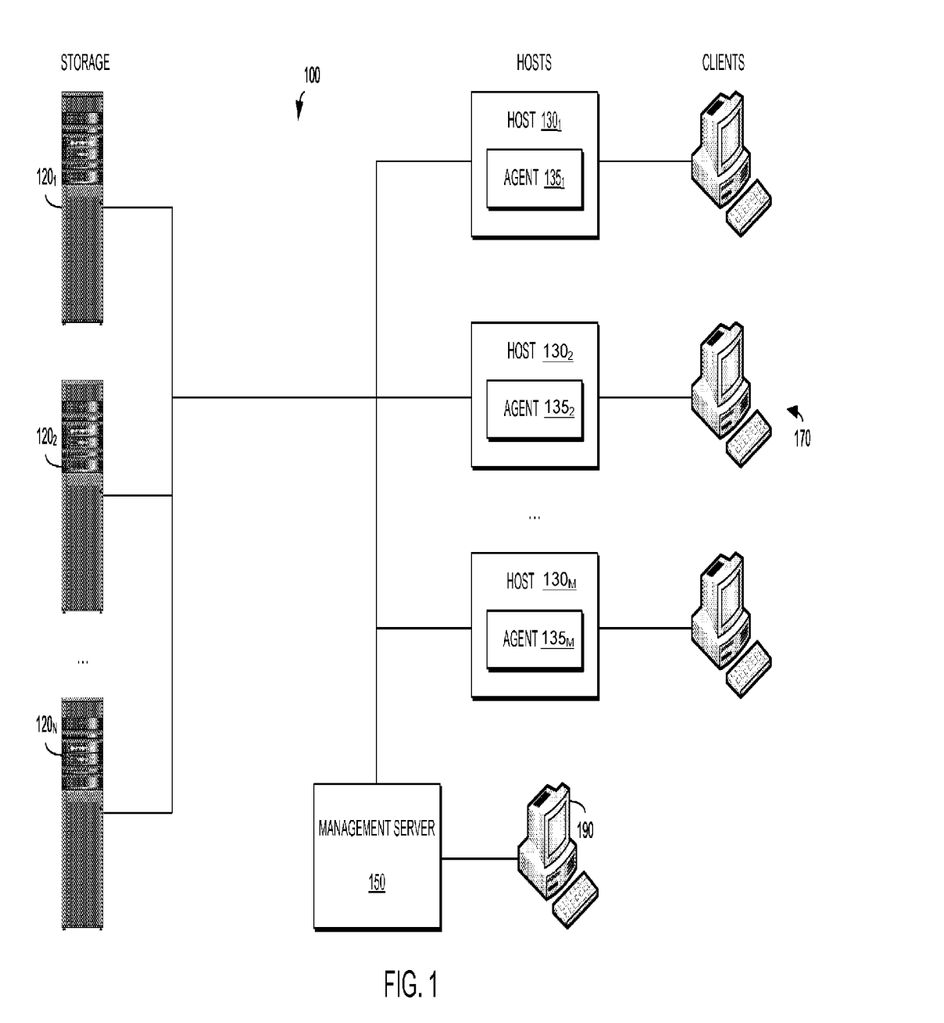
FIG. 1 is a block diagram of a storage area network (SAN) including a storage resource management server according to an example embodiment of the present invention.

FIG. 1 is a block diagram of a storage area network (100) 100 including a plurality of storage resource management hosts 130$_1$-130$_M$ (130 generally) and agents 135$_1$-135$_M$ (135 generally) that may be managed by a storage resource management server 150 according to an example embodiment of the present invention. As illustrated in FIG. 1, the hosts 130 may host applications for clients 170 using the storage 120$_1$-120$_N$ (120 generally). Agents 135 operating on the hosts 130 may manage the applications according to commands from the management server 150. Operation of the applications on the hosts 130 using the storage 120 may generate storage resource management events/notifications that may be received by the agents 135 and provided to the management server 150. The management server 150 may be operated via a terminal 190.

Figure 2:
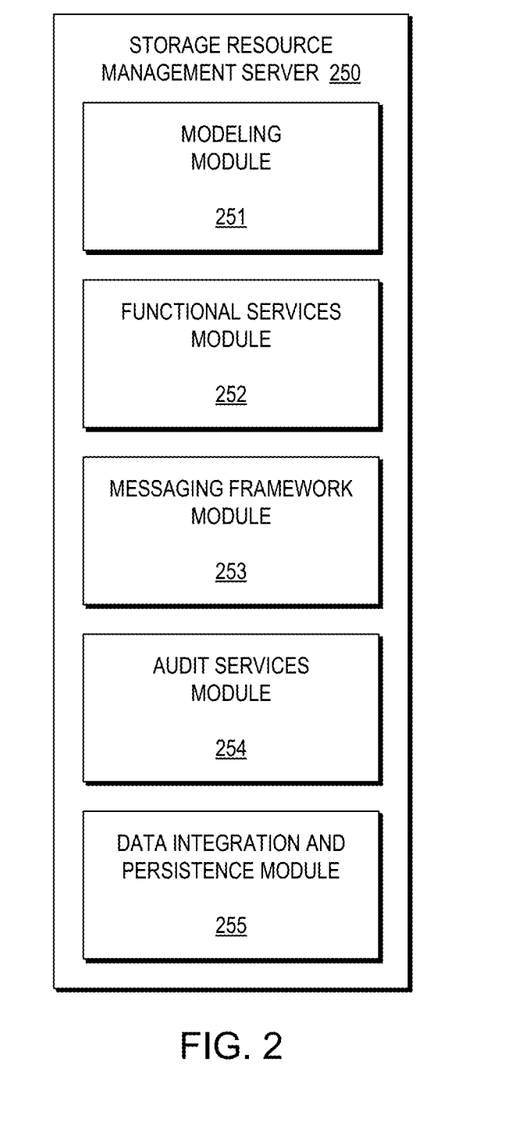
FIGS. 2 and 3 are block diagrams of a storage resource management server according to respective example embodiments of the present invention.
Figure 3:
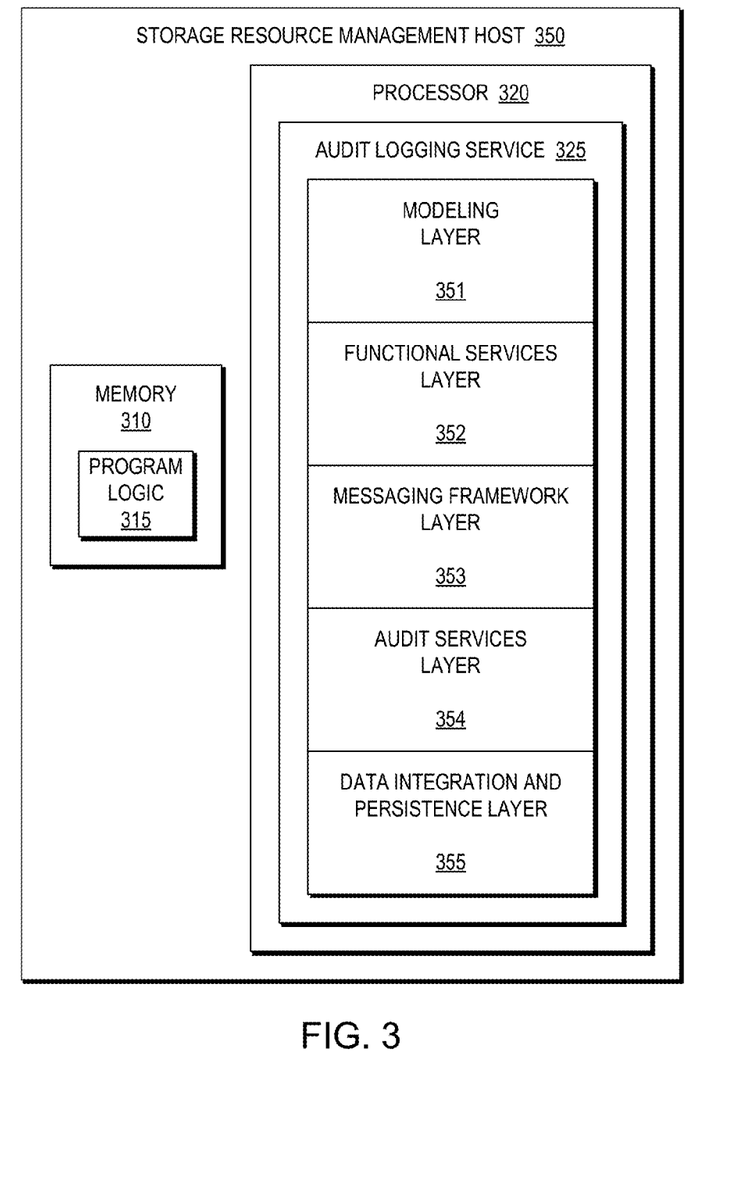

FIGS. 2 and 3 are block diagrams of a storage resource management server 250, 350 according to respective example embodiments of the present invention and may be studied in conjunction. As illustrated in FIG. 2, the storage resource management server 250 may include a modeling module 251, a functional services module 252, a message framework module 253, an audit services module 254, and a data integration and persistence module 255. In another example embodiment, as illustrated in FIG. 3, the storage resource management server 350 also may include memory 310 storing program logic 315 and a processor 320 such that, when the program logic 315 is executed on the processor 320 the processor 320 provides an audit logging service 325. The audit logging service 325 may include a modeling layer 351, a functional services layer 352, a messaging framework layer 353, an audit services layer 354, and a data integration and persistence layer 355.

As illustrated in FIGS. 2 and 3, the modeling module 251/layer 351 may interface with an ontology (i.e., audit) model that models, for example, the resources and properties of the SAN 100 of FIG. 1, and persists the model using, for example, the Resource Description Framework (RDF). The ontology model may include keys (i.e., fields) needed for the audit logging operation of example embodiments of the present invention and, as will be described in greater detail below, message topics that are registered for the audit service (i.e., both functional and audit operations).

The functional services module 252/layer 352 provides an interface to functional services (i.e., applications) operating on hosts 130 in the SAN 100. The functional services module 252/functional services layer 352 may provide listeners in a messaging fabric listening for events having an event type. The functional services may model the events/messages according to the ontology model.

The messaging framework module 253/layer 353 may provide a messaging fabric that may act as a mediator between message publishers (e.g., applications) and message subscribers (e.g., listeners). The functional services may publish (i.e., asynchronously) events/messages to the messaging fabric. The listeners then may relay (i.e., asynchronously) messages having an event type to the audit services module 254/layer 354.

The audit services module 254/layer 354 may receive events from listeners in the messaging fabric and process those events according to the ontology model, as described in greater detail below. Audit data to be persisted may be forwarded to the data integration and persistence module 255/layer 355.

The data integration and persistence module 255/layer 355 may receive audit data to be persisted from the audit services module 254/layer 254 and persist the audit data to a persistent data store. The persistent data store may have a plurality of nodes.

Figure 4:
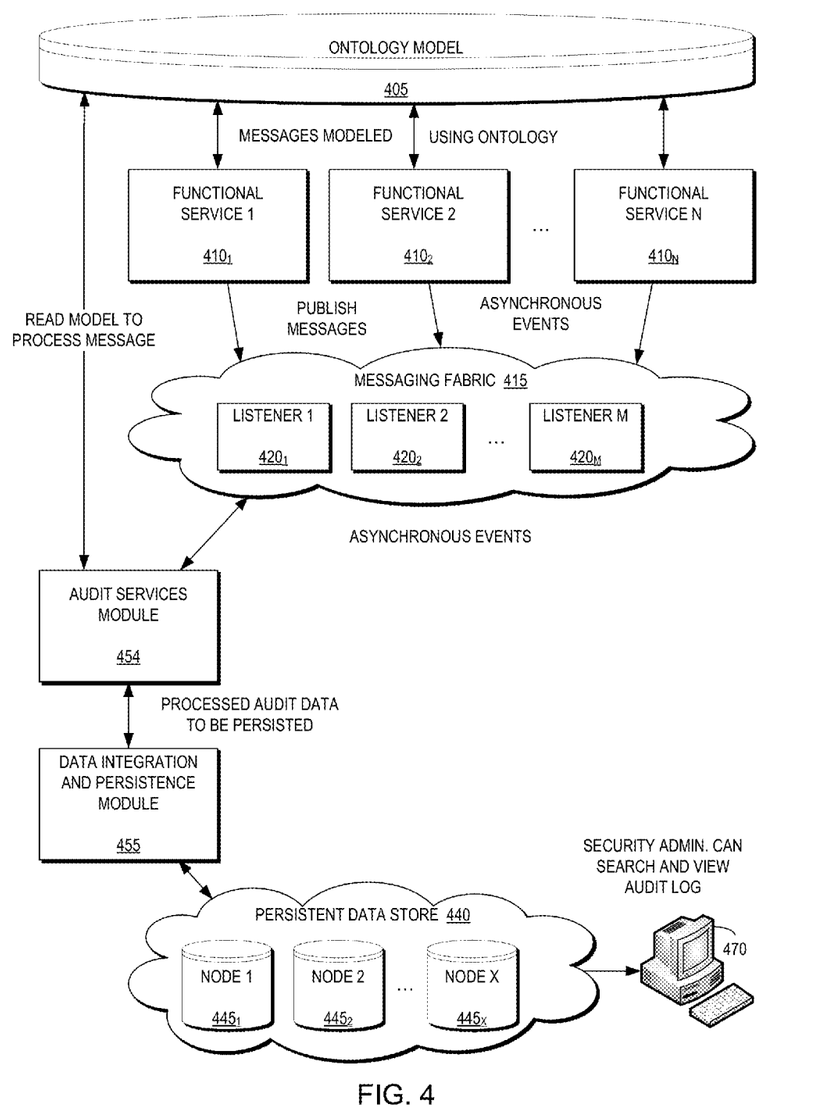
FIG. 4 is a block diagram of a messaging framework according to an example embodiment of the present invention.

FIG. 4 is a block diagram of a messaging framework according to an example embodiment of the present invention. As illustrated in FIG. 4, functional services 1-N $410_1$-$410_N$ (410 generally) (i.e., message publishers) may publish messages to transfer data in a subscriber understandable format. Both the functional services 410 (i.e., publisher) and listeners 1-M $420_1$-$420_M$ (420 generally) (i.e., subscriber) refer to the ontology model 405 to be consistent with the format. Functional services 410 may be applications which send message to the messaging fabric 415 with the topic. In order to enable auditing the specific operation, a user needs to embed the audit data in the same message using the ontology model 405 and publish it to the messaging fabric 415.

Audit listeners 420 may be created upon the service startup (i.e., by the messaging framework module 253/messaging framework layer 353) which may read the ontology model 405 for topics to process messages. If there are multiple audit topics registered in the model store 405, there would be multiple listeners 420 (i.e., each topic has an audit listener, but there may be many functional listeners for the same topic).

In example embodiments of the present invention, the messaging fabric 415 may isolate functional services 410 from each other (i.e., functional services 410 may be decoupled and events/messages may be sent and received asynchronously). Data flow happens across the functional services 410 using messages which are associated with topics. For example, one topic may have any number of listeners 420 and messages having that topic will be notified to all listening listeners 420.

It should be understood that, as described below with reference to FIG. 8, a message (i.e., operation) may be audit processed by adding the topic into the ontology model store 405. New functional services 410 may be registered at runtime or dynamically for audit processing by notifying the audit services module 454 that a new topic needs to be added. The audit services module 454 then may model the given topic according to the ontology model 405 and persist the topic to the ontology model 405. The functional services module 252/layer 352 then may create a listener 420 for the topic. It should be understood that none of the functional services 410 are dependent on each other and any functional service 410 which needs to be audit logged does not need to have any dependency with audit logging service 325 (i.e., the audit logging service 325 of example embodiments of the present invention is decoupled from the functional services 410 being audit logged which may enable audit logging without modifying any piece of code).

For example, upon audit logging service 325 startup, auditable topics may be read from the ontology store 405 and listeners 420 may be created for each audit topic. Upon receipt of a message notification having the topic for which the listener 420 is listening, the listener 420 parses audit related information (i.e., the listener 420 may ignore other functional data). The ontology model 405 may be used to identify the audit objects from the functional object. The audit object then may be processed by the audit services module 454 and forwarded to the data integration and persistence module 455 to be persisted to a persistent data store 440 for further processing, such as by a storage resource management application (i.e., a security administrator can search and view the audit log at a client 470). This achieves loose coupling between the audit logging service 325 and the persistent data store 440.

For example, for a storage resource management application such as ProSphere by EMC Corporation of Hopkinton, Mass., consider functional service 1 $410_1$ as a user management service which has a topic ps.basesrm.uim.user.management which may send notifications to other services to further data processing. In this example, a user may perform create/delete/edit/etc. operations which may be notified to other services (e.g., any of functional services 2-N $410_2$-$410_N$) to process further or persist. To enable audit logging (1) functional service 1 adds the topic ps.basesrm.uim.user.management to the ontology model 405, (2) models the message to be published to the messaging fabric 415 using the audit ontology defined therein, and (3)

appends the modeled message with the existing functional message payload and publishes it to the messaging fabric 415. Note, in this example, the audit and functional messages are published together. It should be understood that, since a messaging framework is used, there may be any number of publishers that may simultaneously publish audit events. For user management operations published using the topic ps.basesrm.uim.user.management, the audit service 425 and functional service 410 would get a notification/event because they subscribed for events having this topic on startup or runtime.

Figure 5:
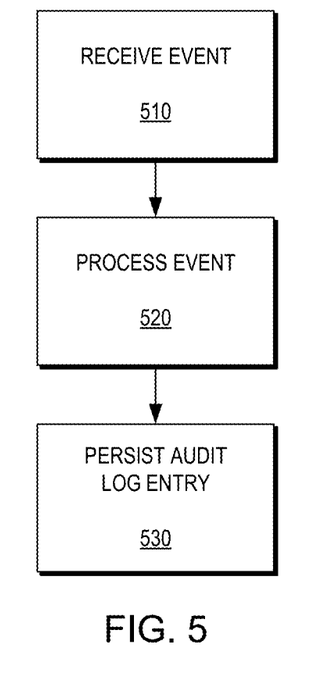
FIGS. 5-8 are flow diagrams according to respective example embodiments of the present invention.

FIG. 5 is a flow diagram illustrating a method for processing an event by the audit service module 425 according to an example embodiment of the present invention. As illustrated in FIG. 5, the listener 420 may receive an event notification related to an event in a storage resource management service (510). The listener 420 then may forward the event to the audit services module 454 which may process the event notification according to the listener 420 in the messaging fabric 425 and the ontology model 405 (520). The processed audit data then may be forwarded to the data integration and persistence module 455 to persist an audit log entry in the persistent data store 440 corresponding to the event (530).

Figure 6:
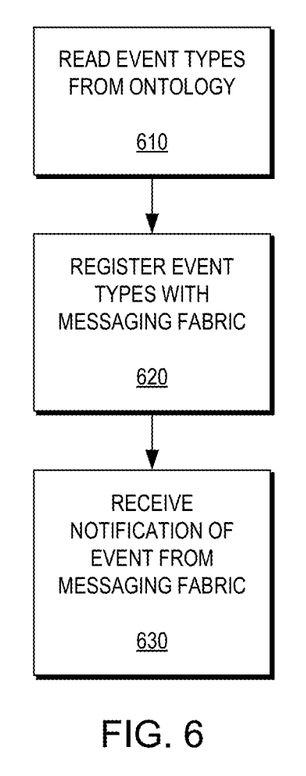

FIG. 6 is a flow diagram illustrating a method for configuring the audit services module 454 according to an example embodiment of the present invention. As illustrated in FIG. 6, the audit services module 454, via the modeling module (e.g., modeling module 251 of FIG. 2), may read event types from the ontology model 405 (610) and, in turn, register those event types with the messaging fabric 415 (620). As a result of such registration, the audit services module 454 may receive notification of events from the messaging fabric 415 having event types that match the registered event types (630).

Figure 7:
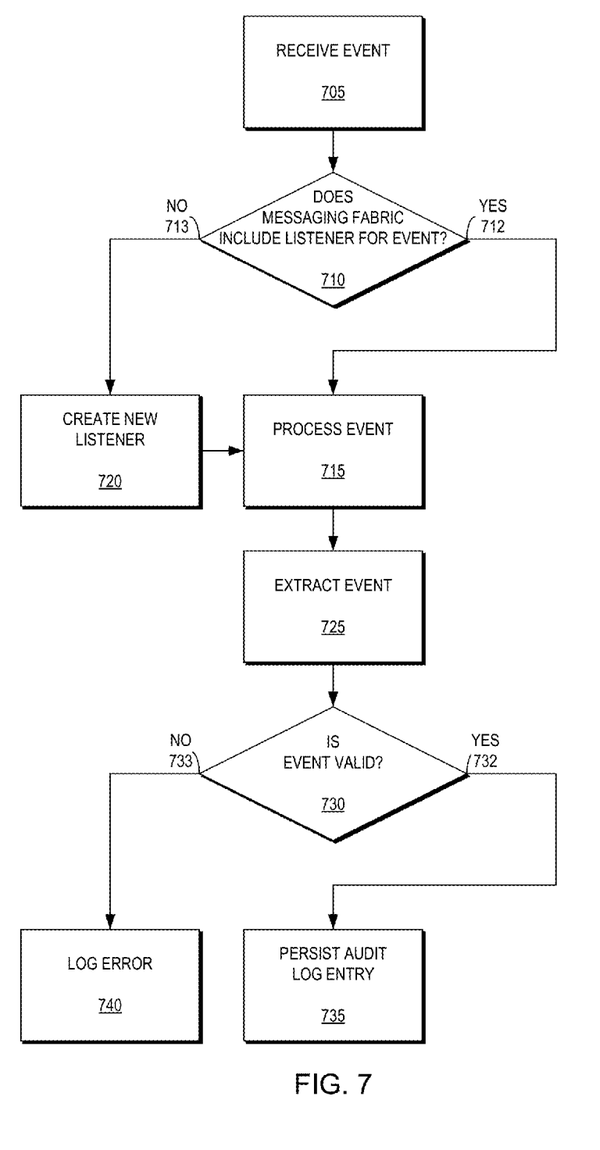

FIG. 7 is a flow diagram illustrating receipt and persistence of an event according to an example embodiment of the present invention. As illustrated in FIG. 7, the messaging fabric 415 may receive an event from a functional service 410 (705). The messaging fabric then may cause the event to be processed regardless of whether or not the messaging fabric 415 includes a listener 420 for the event (710). For example, if the messaging fabric 415 includes a listener 420 for the event (712), the listener 420 may forward the event to the audit services module 454 for processing (715). If the messaging framework 415 does not include a listener 420 for the event (713), the messaging framework 415 may create a new listener 420 (720) which then may forward the event to the audit services module 454 for processing (715). The audit services module 454 then may extract the event from other data (725) and determine whether the event is valid (730). If the event is valid (732), the audit services module 454 may forward the event to the data integration and persistence module 455 to persist an audit log entry in the persistent data store 440 (735). Otherwise, if the event is not valid (733), the audit services module 454 may instruct the data integration and persistence module 455 to log an error (740).

Figure 8:
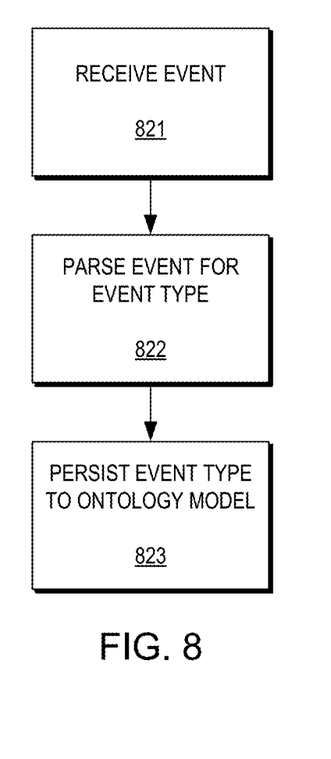

FIG. 8 is a flow diagram illustrating a method for persisting event types to the ontology model 405. As illustrated in FIG. 8, the audit services module 454 may receive an event (821) and parse the event for an event type (822). The audit services module 454 then may persist the event type to the ontology model 405 (823).

Figure 9:
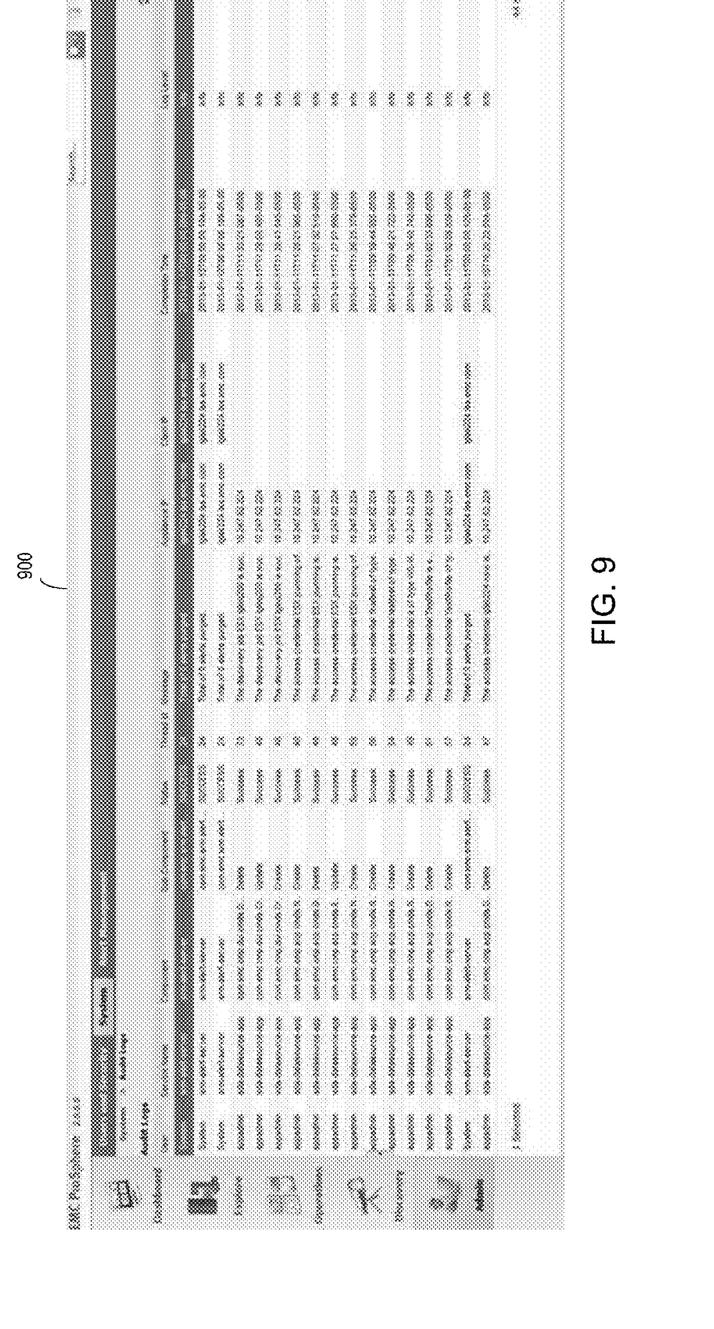
FIG. 9 is a screen shot of an audit log according to an example embodiment of the present invention.

FIG. 9 is a screen shot of an audit log according to an example embodiment of the present invention. As illustrated in FIG. 9, the audit log may display information including user, service name, component, sub-component, status, thread ID, message, appliance IP, client IP, completion time, and log level.

Figure 10:
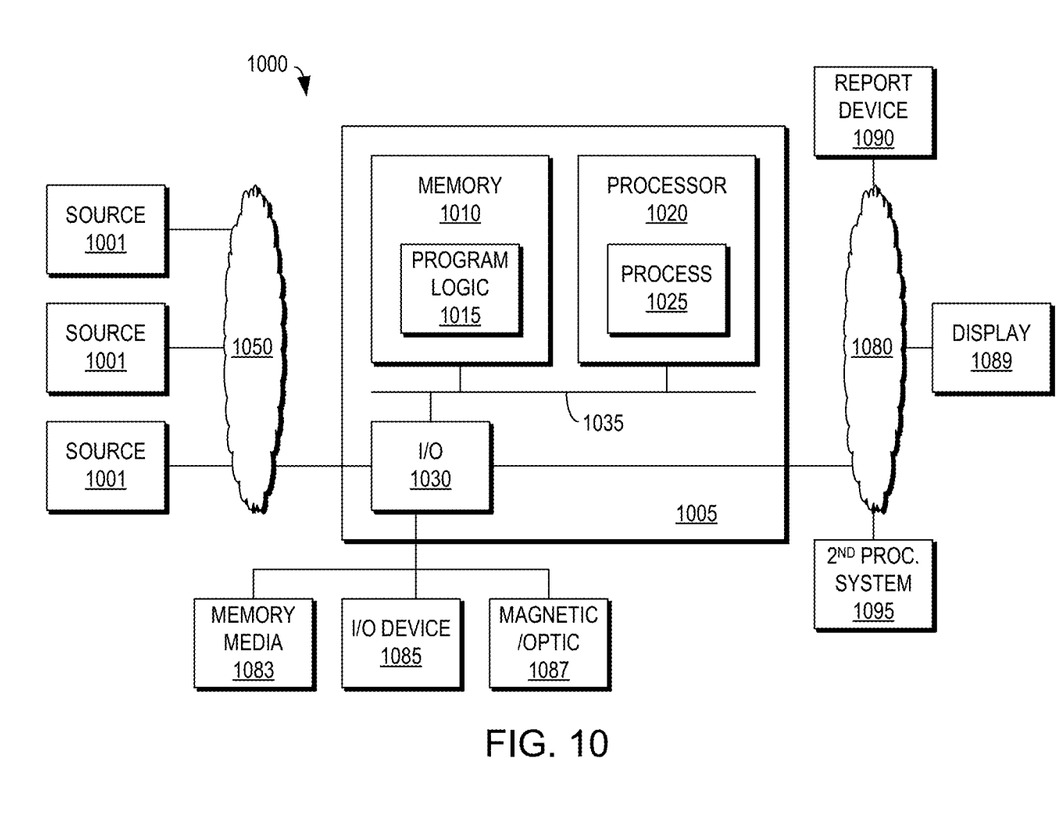
FIG. 10 is a block diagram of an example embodiment apparatus according to the present invention.

FIG. 10 is a block diagram of an example embodiment apparatus 1005 according to the present invention. The apparatus 1005 may be part of a system 1000 and includes memory 1010 storing program logic 1015, a processor 1020 for executing a process 1025, and a communications I/O interface 1030, connected via a bus 1035.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 10, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 11:
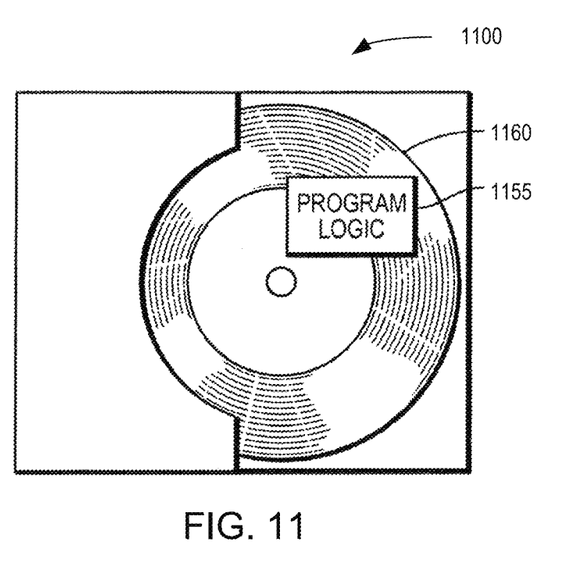
FIG. 11 is an illustration of an example embodiment of the present invention as embodied in program code.

FIG. 11 shows program logic 1155 embodied on a computer-readable medium 1160 as shown, and wherein the logic 1155 is encoded in computer-executable code configured for carrying out the methods of this invention, thereby forming a computer program product 1100.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
   receiving, in a storage resource management service associated with a storage area network (SAN), an event notification having one or more event types related to one or more events at one or more event listeners configured to receive event notifications having the one or more event types in a messaging fabric according to a publish/subscribe communications model;
   processing the event notification according to an ontology model, the ontology model comprising keys corresponding to event types for event audit logging, the ontology model being configured to model resources and properties of the SAN and event types; and
   persisting one or more audit log entries corresponding to the one or more events according to the processed event notifications;
   wherein the storage resource management service is configured to implement a messaging framework comprising:
   a plurality of functional services implemented by applications running on storage resource management hosts in the SAN, the plurality of functional services being configured to detect events in the SAN and to publish messages for the detected events to the messaging fabric, the messages comprising keys in the event ontology corresponding to designated SAN event types;

a plurality of event listeners associated with different SAN event types in the ontology model, each of the plurality of event listeners being configured to detect published messages having keys corresponding to one or more designated SAN event types and to parse the published messages having keys corresponding to its designated SAN event types to identify audit-related information embedded therein by one or more of the applications running on the storage resource managements hosts in the SAN; and a persistent data store configured to store the audit-related information parsed by the plurality of event listeners in an audit log and to provide an interface for searching and viewing the audit log.

2. The method of claim 1 wherein receiving the event notification comprises:

identifying the one or more event types for the one or more events in the event notification;

determining whether the messaging fabric comprises event listeners configured to receive event notifications related to events having the identified event types; and creating a new event listener configured to receive event notifications related to events having a given event type responsive to determining that the messaging fabric does not include an event listener configured to receive event notifications related to events having the given event type.

3. The method of claim 2 wherein creating a new event listener configured to receive event notifications related to events having the given event type comprises:

receiving the event notification;

parsing the event notification to identify the given event type; and persisting the given event type to the ontology model.

4. The method of claim 1 further comprising:

reading event types from the ontology model; and registering the event types with the messaging fabric;

wherein receiving the event notification comprises receiving the event notification from one or more of the event listeners in the messaging fabric.

5. The method of claim 1 wherein processing the event notification according to the ontology model comprises:

extracting a given event from the event notification; and determining whether the given event is valid.

6. The method of claim 5 wherein determining whether the given event is valid comprises determining whether the given event includes attributes required for its associated event type.

7. The method of claim 6 wherein persisting the one or more audit log entries comprises persisting a given audit log entry corresponding to the given event responsive to determining that the given event is valid.

8. The method of claim 6 further comprising logging an error indicating that the given event is invalid instead of persisting a given audit log entry corresponding to the given event responsive to determining that the given event is invalid.

9. The method of claim 1 wherein at least one of the messages is published asynchronously relative to detection of one or more corresponding events by one or more of the plurality of applications running on the storage resource management hosts in the SAN.

10. The method of claim 1 wherein a given message published by a given application running on a given storage resource management host in the SAN comprises a functional message and an audit message, the functional message comprising a payload specifying one or more operations performed on a storage resource in the SAN and the audit message comprising a representation of the operations performed on the storage resource in the SAN defined in accordance with the ontology model.

11. A system comprising:

one or more processors; and memory storing computer program code that when executed on the one or more processors causes the system to:

receive, in a storage resource management service associated with a storage area network (SAN), an event notification having one or more event types related to one or more events at one or more event listeners configured to receive event notifications having the one or more event types in a messaging fabric according to a publish/subscribe communications model;

process the event notification according to an ontology model, the ontology model comprising keys corresponding to event types for event audit logging, the ontology model being configured to model resources and properties of the SAN and event types; and persist one or more audit log entries corresponding to the one or more events according to the processed event notification;

wherein the storage resource management service is configured to implement a messaging framework comprising:

a plurality of functional services implemented by applications running on storage resource management hosts in the SAN, the plurality of functional services being configured to detect events in the SAN and to publish messages for the detected events to the messaging fabric, the messages comprising keys in the event ontology corresponding to designated SAN event types;

a plurality of event listeners associated with different SAN event types in the ontology model, each of the plurality of event listeners being configured to detect published messages having keys corresponding to one or more designated SAN event types and to parse the published messages having keys corresponding to its designated SAN event types to identify audit-related information embedded therein by one or more of the applications running on the storage resource managements hosts in the SAN; and a persistent data store configured to store the audit-related information parsed by the plurality of event listeners in an audit log and to provide an interface for searching and viewing the audit log.

12. The system of claim 11 further comprising computer program code that when executed on the one or more processors causes the system:

to identify the one or more event types for the one or more events in the event notification;

to determine whether the messaging fabric comprises event listeners configured to receive event notifications related to events having the identified event types; and to create a new event listener configured to receive event notifications related to events having a given event type responsive to determining that the messaging fabric does not include event listener configured to receive event notifications related to events having the given event type.

13. The system of claim 12 further comprising computer program code that when executed on the one or more processors causes the system:
to receive the event notification;
to parse the event notification to identify the given event type; and
to persist the given event type to the ontology model.

14. The system of claim 11 further comprising computer program code that when executed on the one or more processors causes the system:
to read event types from the ontology model;
to register the event types with the messaging fabric; and
to receive the event notification from one or more of the event listeners in the messaging fabric.

15. The system of claim 11 further comprising computer program code that when executed on the one or more processors causes the system:
to extract a given event from the event notification; and
to determine whether the given event is valid.

16. The system of claim 15 further comprising computer program code that when executed on the one or more processors causes the system to determine whether the given event includes attributes required for its associated event type.

17. The system of claim 16 further comprising computer program code that when executed on the one or more processors causes the system to persist a given audit log entry corresponding to the given event responsive to determining that the given event is valid.

18. The system of claim 16 further comprising computer program code that when executed on the one or more processors causes the system to log an error indicating that the given event is invalid instead of persisting a given audit log entry corresponding to the given event responsive to determining that the given event is invalid.

19. The system of claim 11 wherein a given message published by a given application running on a given storage resource management host in the SAN comprises a functional message and an audit message, the functional message comprising a payload specifying one or more operations performed on a storage resource in the SAN and the audit message comprising a representation of the operations performed on the storage resource in the SAN defined in accordance with the ontology model.

20. A computer program product having a non-transitory computer readable storage medium having computer program code encoded thereon comprising:

computer program code for receiving, in a storage resource management service associated with a storage area network (SAN), an event notification having one or more event types related to one or more event at one or more event listeners configured to receive event notifications having the one or more event types in a messaging fabric according to a publish/subscribe communications model;

computer program code for processing the event notification according to an ontology model, the ontology model comprising keys corresponding to event types for event audit logging, the ontology model being configured to model resources and properties of the SAN and event types; and computer program code for persisting one or more audit log entries corresponding to the one or more events according to the processed event notification;

wherein the storage resource management service is configured to implement a messaging framework comprising:
a plurality of functional services implemented by applications running on storage resource management hosts in the SAN, the plurality of functional services being configured to detect events in the SAN and to publish messages for the detected events to the messaging fabric, the messages comprising keys in the event ontology corresponding to designated SAN event types;
a plurality of event listeners associated with different SAN event types in the ontology model, each of the plurality of event listeners being configured to detect published messages having keys corresponding to one or more designated SAN event types and to parse the published messages having keys corresponding to its designated SAN event types to identify audit-related information embedded therein by one or more of the applications running on the storage resource managements hosts in the SAN; and
a persistent data store configured to store the audit-related information parsed by the plurality of event listeners in an audit log and to provide an interface for searching and viewing the audit log.

21. The computer program product of claim 20 wherein a given message published by a given application running on a given storage resource management host in the SAN comprises a functional message and an audit message, the functional message comprising a payload specifying one or more operations performed on a storage resource in the SAN and the audit message comprising a representation of the operations performed on the storage resource in the SAN defined in accordance with the ontology model.

* * * * *